(12) United States Patent
Lin et al.

(10) Patent No.: US 11,017,460 B1
(45) Date of Patent: May 25, 2021

(54) ELECTRONIC SHELF SYSTEM

(71) Applicant: QISDA CORPORATION, Taoyuan (TW)

(72) Inventors: Chih-Ren Lin, New Taipei (TW);
Cheng-Te Tseng, Taipei (TW);
Wei-Min Chiu, Taoyuan (TW);
Chen-Chen Tsai, Taoyuan (TW);
Ming-Yi Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/858,753

(22) Filed: Apr. 27, 2020

(30) Foreign Application Priority Data

Jan. 10, 2020 (TW) ................................ 109100884

(51) Int. Cl.
| | |
|---|---|
| G05B 19/00 | (2006.01) |
| G05B 23/00 | (2006.01) |
| G06F 7/00 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| G06Q 30/06 | (2012.01) |
| G06F 3/147 | (2006.01) |

(52) U.S. Cl.
CPC ......... G06Q 30/0641 (2013.01); G06F 3/147 (2013.01); G06Q 30/0621 (2013.01); G09G 2354/00 (2013.01); G09G 2380/04 (2013.01)

(58) Field of Classification Search
CPC ............ G06Q 30/0641; G06Q 30/0621; G06F 3/147; G09G 2354/00; G09G 2380/04
USPC ........................................................ 340/5.91
See application file for complete search history.

(56) References Cited

U.S. PATENT DOCUMENTS 8,463,647 B2 6/2013 Sugimoto
2019/0282000 A1* 9/2019 Swafford ................ A47F 10/02

FOREIGN PATENT DOCUMENTS

| AU | 2012101303 B4 * | 7/2013 |
|---|---|---|
| CN | 107493319 A | 12/2017 |
| CN | 110221700 A | 9/2019 |
| TW | M560634 U | 5/2018 |
| TW | M580217 U | 7/2019 |

* cited by examiner

Primary Examiner — Tanmay K Shah

(57) ABSTRACT

An electronic shelf system includes a shelf, a first display unit, a first sensing unit, a storage unit and a processing unit, wherein the processing unit communicates with the first display unit, the first sensing unit and the storage unit. The shelf includes a compartment. The first display unit is disposed on the compartment. The first sensing unit is disposed on the shelf. The first sensing unit is configured to sense a characteristic parameter. The storage unit stores a plurality of display information. The processing unit receives the characteristic parameter from the first sensing unit and controls the first display unit to switch one of the display information being displayed currently to another one of the display information according to the characteristic parameter.

23 Claims, 8 Drawing Sheets

ELECTRONIC SHELF SYSTEM

BACKGROUND OF THE INVENTION

1. Field of the Invention

The invention relates to an electronic shelf system and, more particularly, to an electronic shelf system capable of switching display information for different consumers in real time.

2. Description of the Prior Art

In general, a shopping mall (e.g. convenience store, super market, department store, etc.) usually places various products on a shelf for a consumer to select. Furthermore, some shelves are equipped with a display device for displaying price information, advertisement information or other information of products. The information displayed by the display device of the shelf is set by an administrator in advance and cannot be switched for different consumers in real time. When the information displayed by the display device cannot interest the consumer, the purchase intention of the consumer may reduce, such that sales revenue may be influenced.

SUMMARY OF THE INVENTION

An objective of the invention is to provide an electronic shelf system capable of switching display information for different consumers in real time, so as to solve the aforesaid problems.

According to an embodiment of the invention, an electronic shelf system comprises a shelf, a first display unit, a first sensing unit, a storage unit and a processing unit, wherein the processing unit communicates with the first display unit, the first sensing unit and the storage unit. The shelf comprises a compartment. The first display unit is disposed on the compartment. The first sensing unit is disposed on the shelf. The first sensing unit is configured to sense a characteristic parameter. The storage unit stores a plurality of display information. The processing unit receives the characteristic parameter from the first sensing unit and controls the first display unit to switch one of the display information being displayed currently to another one of the display information according to the characteristic parameter.

As mentioned in the above, the invention utilizes the sensing unit to sense the characteristic parameter related to a consumer and controls the display unit to switch the display information according to the sensed characteristic parameter, so as to interest the consumer. Accordingly, the invention is capable of switching the display information for different consumers in real time, so as to increase the purchase intention of the consumer effectively and then increase sales revenue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
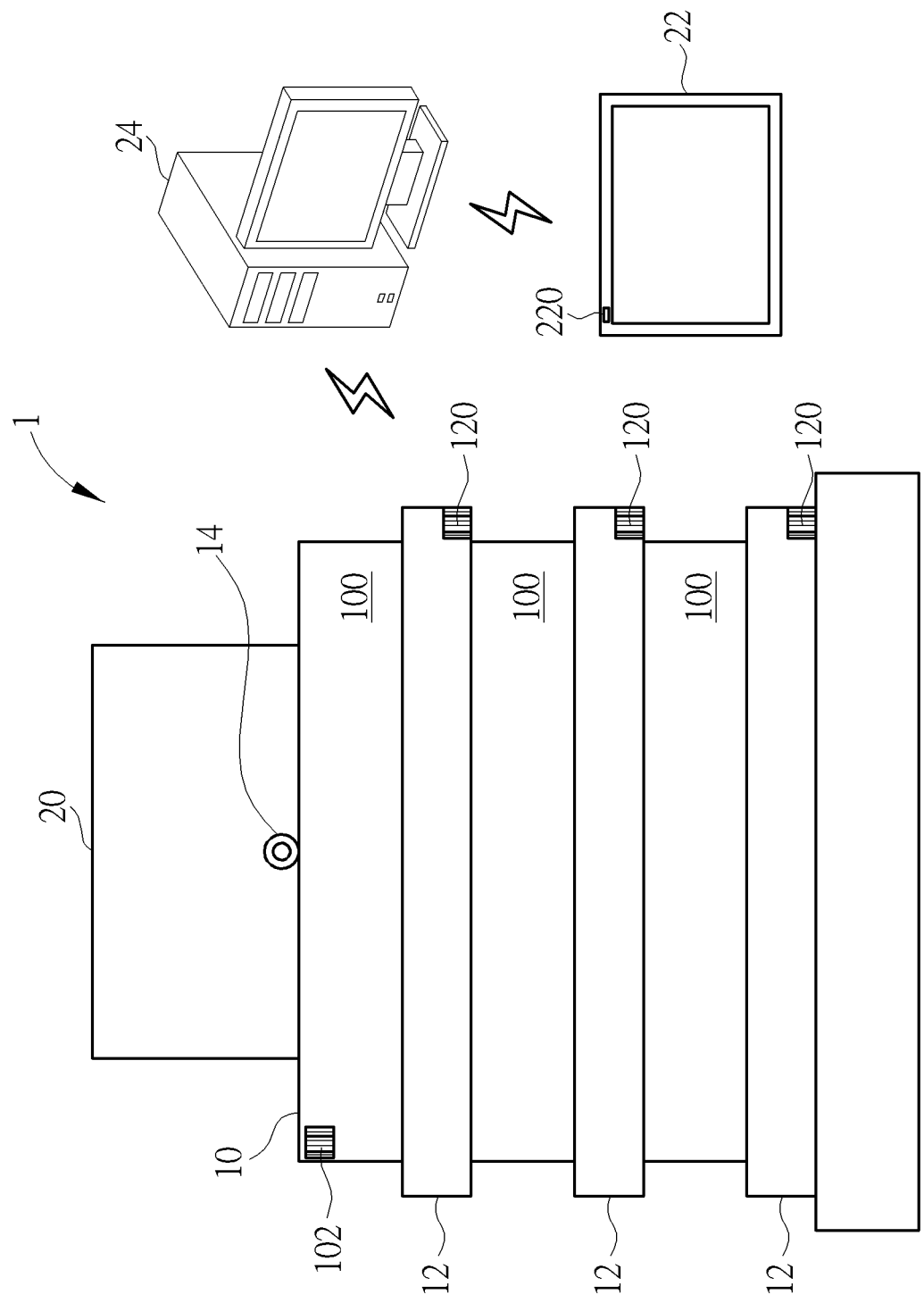
FIG. 1 is a schematic view illustrating an electronic shelf system according to an embodiment of the invention.
Figure 2:
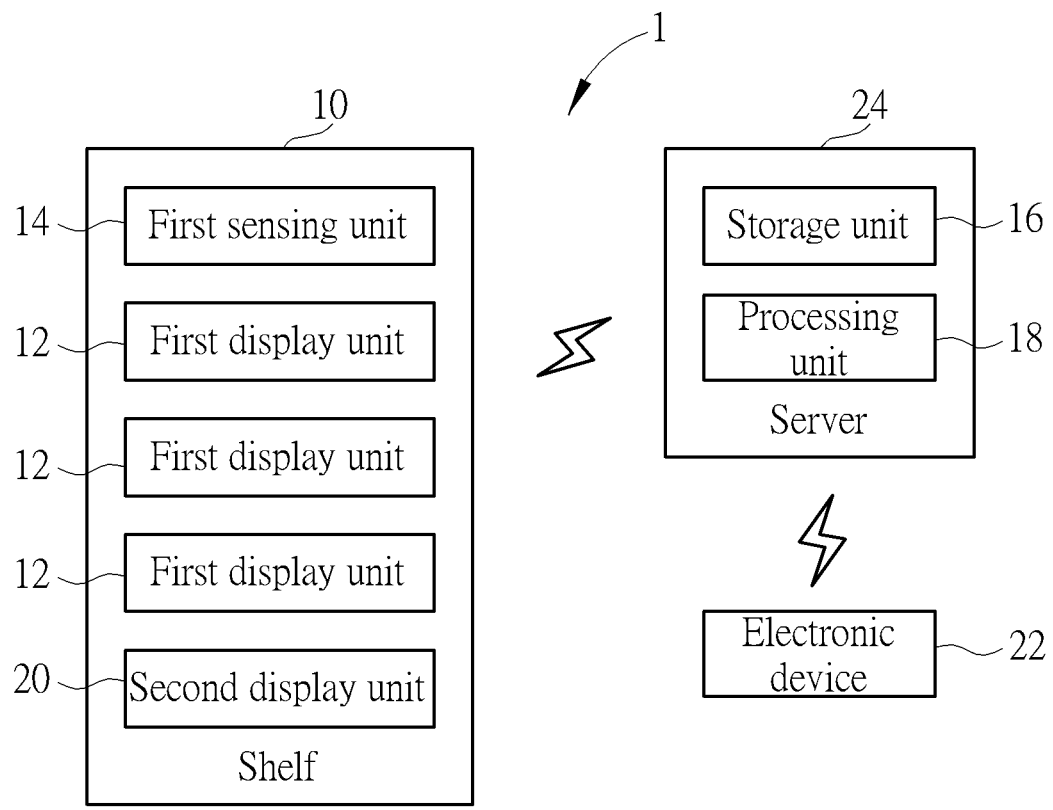
FIG. 2 is a functional block diagram illustrating the electronic shelf system shown in FIG. 1.
Figure 3:
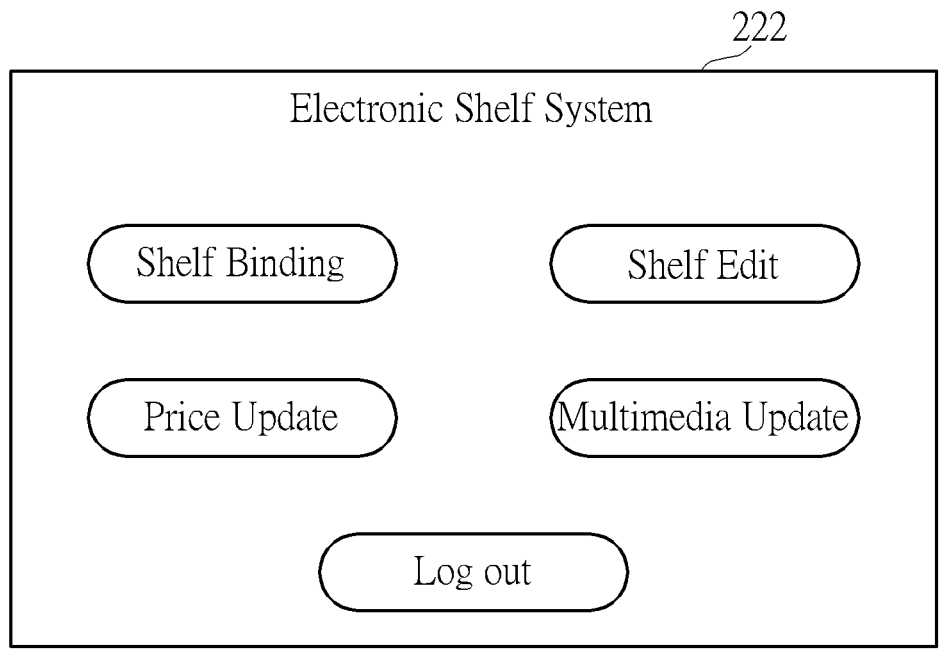
FIG. 3 is a schematic view illustrating a user interface according to an embodiment of the invention.
Figure 4:
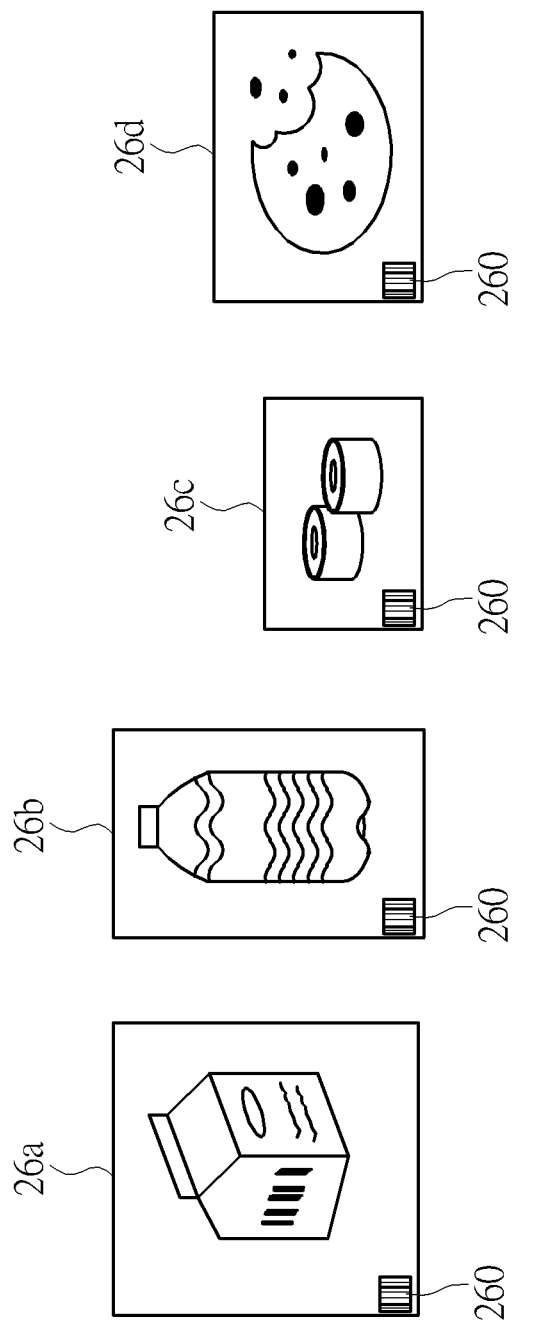
FIG. 4 is a schematic view illustrating a plurality of products according to an embodiment of the invention.
Figure 5:
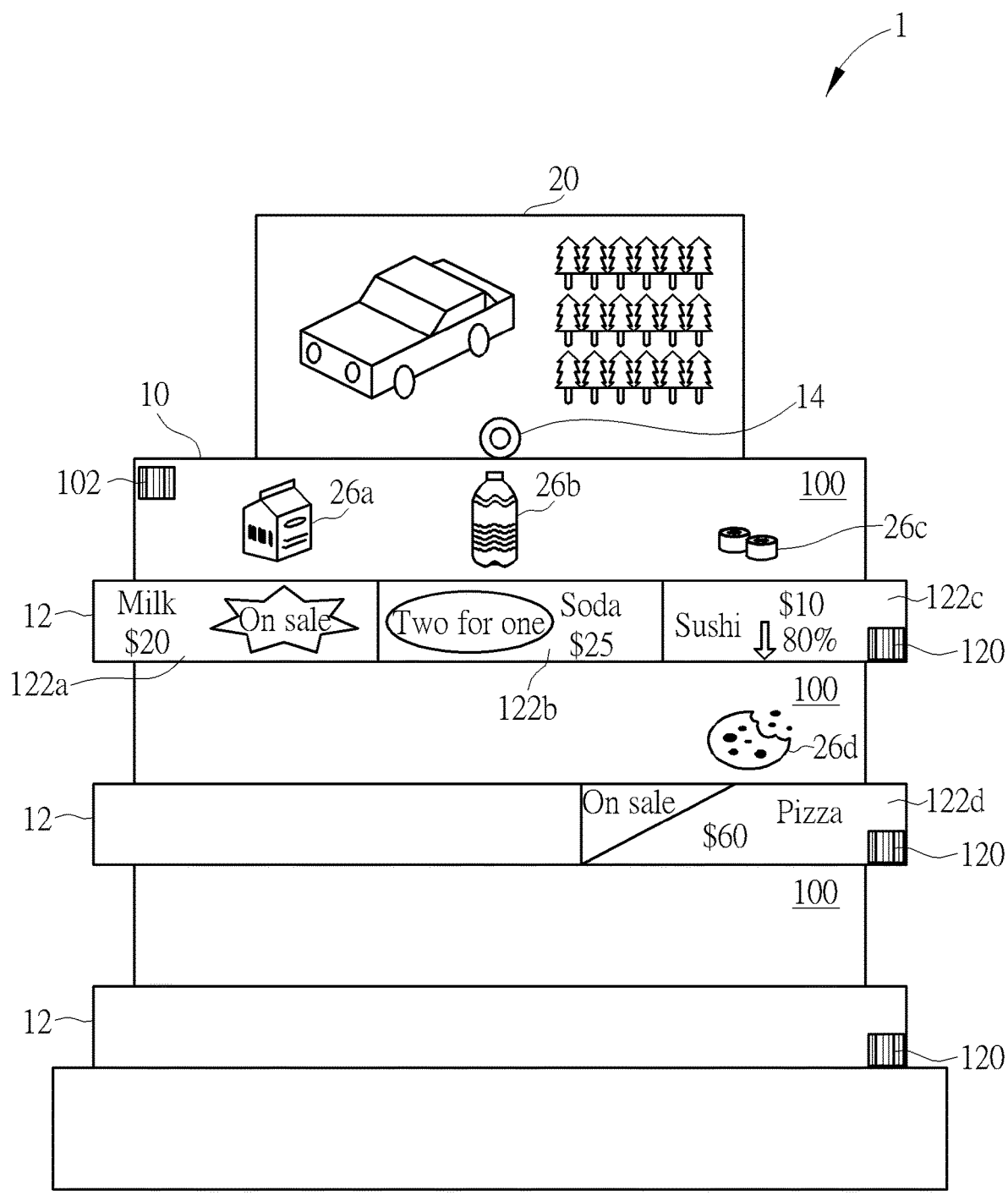
FIG. 5 is a schematic view illustrating the products shown in FIG. 4 being placed on the shelf shown in FIG. 1.
Figure 6:
FIG. 6 is a schematic view illustrating a plurality of price templates according to an embodiment of the invention.
Figure 6:
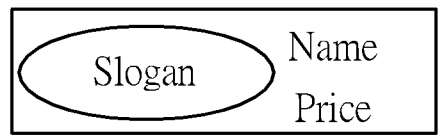
Figure 6:
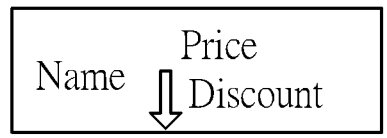
Figure 6:
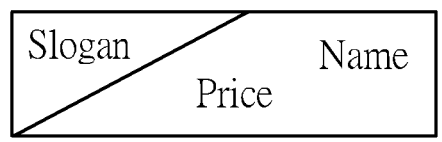

Referring to FIGS. 1 to 6, FIG. 1 is a schematic view illustrating an electronic shelf system 1 according to an embodiment of the invention, FIG. 2 is a functional block diagram illustrating the electronic shelf system 1 shown in FIG. 1, FIG. 3 is a schematic view illustrating a user interface 222 according to an embodiment of the invention, FIG. 4 is a schematic view illustrating a plurality of products 26a, 26b, 26c, 26d according to an embodiment of the invention, FIG. 5 is a schematic view illustrating the products 26a, 26b, 26c, 26d shown in FIG. 4 being placed on the shelf 10 shown in FIG. 1, and FIG. 6 is a schematic view illustrating a plurality of price templates according to an embodiment of the invention.

As shown in FIGS. 1 and 2, the electronic shelf system 1 comprises a shelf 10, a first display unit 12, a first sensing unit 14, a storage unit 16, a processing unit 18, a second display unit 20 and an electronic device 22. In this embodiment, the shelf 10 may comprise a plurality of compartments 100 and the electronic shelf system 1 may comprise a plurality of first display units 12, wherein each of the first display units 12 is disposed on one of the compartments 100. It should be noted that the number of compartments 100 may be one or more and the number of first display units 12 may be one or more corresponding to the number of compartments 100, so the invention is not limited to the embodiment shown in the figure.

The first sensing unit 14 and the second display unit 20 are disposed on the shelf 10. The storage unit 16 and the processing unit 18 may be disposed in a server 24. The server 24 may communicate with the first display unit 12, the first sensing unit 14, the second display unit 20 and the electronic device 22 by a wired or wireless manner, such that the processing unit 18 communicates with the first display unit 12, the first sensing unit 14, the second display unit 20 and the electronic device 22. It should be noted that the wired or wireless communication is well known by one skilled in the art, so the explanation will not be depicted herein. Furthermore, the processing unit 18 may communicate with the storage unit 16 in the server 24 by a circuit connection.

In practical applications, the first display unit 12 and the second display unit 20 may be liquid crystal display devices or other display devices, the storage unit 16 may be a hard disc, a memory or other data storage devices, the processing unit 18 may be a processor or a controller with data processing function, and the electronic device 22 may be a tablet computer or other portable electronic devices.

In this embodiment, the shelf 10 may comprise a shelf tag 102, each of the first display units 12 may comprise a display unit tag 120, and the electronic device 22 may comprise a reader 220. The reader 220 may be configured to read the shelf tag 102 and the display unit tag 120. In this embodiment, the reader 220 may be a radio frequency identification (RFID) reader, a barcode reader or other readers, and the shelf tag 102 and the display unit tag 120 may be RFID tags, barcode tags or other tags corresponding to the reader 220.

Furthermore, the electronic device 22 may further comprise a user interface 222, as shown in FIG. 3. The user interface 222 may be provided by an electronic shelf management application installed in the electronic device 22. In this embodiment, the user interface 222 may provide a shelf binding function, a shelf edit function, a price update function and a multimedia update function, but is not so limited. The user interface 222 may also provide other functions according to practical applications.

When the electronic shelf system 1 of the invention is being used, a user may use the shelf binding function of the user interface 222 to bind the shelf 10 and each of the first display unit 12 into a group. When the user selects the shelf binding button of the user interface 222, the user may operate the electronic device 22 to read the shelf tag 102 of the shelf 10 by the reader 220, so as to obtain a binding information of the shelf 10. In this embodiment, the binding information of the shelf 10 may be, but not limited to, a shelf number. Then, the user may name the shelf 10. Then, the user may operate the electronic device 22 to read the display unit tag 120 of each of the first display units 12 by the reader 220, so as to obtain a binding information of each of the first display units 12. In this embodiment, the binding information of the first display unit 12 may be, but not limited to, a media access control (MAC) address and/or an Internet Protocol (IP) address. Then, the user may utilize the aforesaid binding information to bind the shelf 10 and each of the first display unit 12. At this time, the electronic device 22 may transmit the binding content to the server 24 to store the binding content in the storage unit 16.

If the user wants to add and/or delete the first display unit 12 or amend the name of the shelf 10, the user may use the shelf edit function of the user interface 222 to edit it. It should be noted that the operation of the shelf edit function is essentially identical to the operation of the shelf binding function, so the repeated explanation will not be depicted herein again.

As shown in FIG. 5, the products 26a, 26b, 26c, 26d may be placed on the shelf 10 for a consumer to select. As shown in FIG. 4, each of the products 26a, 26b, 26c, 26d may comprise a product tag 260. The reader 220 of the electronic device 22 may also be configured to read the product tag 260. In this embodiment, the product tag 260 may be an RFID tag, a barcode tag or other tags corresponding to the reader 220. Furthermore, the storage unit 16 may further store an arrangement rule, a shelf information corresponding to the shelf 10 and a plurality of product information corresponding to the products 26a, 26b, 26c, 26d. It should be noted that, for each of the products, only one is shown in the figure for illustration purpose. In practical applications, for each of the products, there may be one or more placed on the shelf 10. Still further, the kinds of products may be determined according to practical applications, so the invention is not limited to the embodiment shown in the figure.

In this embodiment, the user may operate the electronic device 22 to read the shelf tag 102 of the shelf 10 and the product tag 260 of each of the products 26a, 26b, 26c, 26d by the reader 220, such that the processing unit 18 generates an arrangement manner for arranging the products 26a, 26b, 26c, 26d on the compartments 100 according to the shelf information, the product information and the arrangement rule and controls the first display units 12 to display content (e.g. name, number, price, etc.) of the products 26a, 26b, 26c, 26d according to the arrangement manner.

In this embodiment, the shelf information may comprise a size, an allowable weight or a combination thereof of each of the compartments 100, the product information may comprise a size, a weight or a combination thereof of each of the products 26a, 26b, 26c, 26d, and the arrangement rule may comprise a sales revenue, a profit, a historical sales volume or a combination thereof of each of the products 26a, 26b, 26c, 26d.

For example, the arrangement rule may sort the products 26a, 26b, 26c, 26d according to the sales revenue of the products and then place the products 26a, 26b, 26c, 26d on the compartments 100 of the shelf 10 from left to right and from top to bottom according to the sort result. It is assumed that the sales revenue of the products 26a, 26b, 26c, 26d from high to low is sorted as products 26a, 26b, 26d, 26c in sequence. Then, the processing unit 18 generates the arrangement manner according to the sizes of the compartments 100 and the sizes of the products. It is assumed that after the products 26a, 26b are placed on the most top compartment 100, the remaining size can only accommodate the product 26c but cannot accommodate the product 26d. Then, the arrangement manner may suggest that the product 26d should be placed on the middle compartment 100 and suggest that the product 26c should be placed on the most top compartment 100 together with the products 26a, 26b. Accordingly, the invention may provide an optimal arrangement manner of the products for the user to refer to.

For example, the arrangement rule may sort the products 26a, 26b, 26c, 26d according to the historical sales volume of the products and then place the products 26a, 26b, 26c, 26d on the compartments 100 of the shelf 10 from left to right and from top to bottom according to the sort result. It is assumed that the historical sales volume of the products 26a, 26b, 26c, 26d from high to low is sorted as products 26a, 26b, 26d, 26c in sequence. Then, the processing unit 18 generates the arrangement manner according to the allowable weights of the compartments 100 and the weights of the products. It is assumed that after the products 26a, 26b are placed on the most top compartment 100, the remaining allowable weight can only support the weight of the product 26c but cannot support the weight of the product 26d. Then, the arrangement manner may suggest that the product 26d should be placed on the middle compartment 100 and suggest that the product 26c should be placed on the most top compartment 100 together with the products 26a, 26b. Accordingly, the invention may provide an optimal arrangement manner of the products for the user to refer to.

In this embodiment, the arrangement manner may comprise an arrangement position of each of the products 26a, 26b, 26c, 26d on at least one of the compartments 100 and a size of a display area of the first display unit 12. As shown in FIG. 5, the arrangement manner may suggest that the products 26a, 26b, 26c should be placed on the most top compartment 100 and the product 26d should be placed on the middle compartment 100. Furthermore, the arrangement manner may divide the most top first display unit 12 into three display areas 122a, 122b, 122c corresponding to the products 26a, 26b, 26c and divide the middle first display unit 12 into one display area 122d corresponding to the product 26d. At this time, the display areas 122a, 122b, 122c, 122d will display the contents of the products 26a, 26b, 26c, 26d, respectively. Accordingly, the user may place the products 26a, 26b, 26c, 26d on the corresponding compartments 100 according to the contents displayed by the display areas 122a, 122b, 122c, 122d.

In this embodiment, the electronic device 22 may read the display unit tag 120 of any first display unit 12 by the reader 220, such that the first display unit 120 enters an editable mode in the user interface 222, so as to allow the user to use the user interface 222 to edit the display areas and/or the products corresponding to the display areas. For example, when the user operates the electronic device 22 to read the display unit tag 120 of the most top first display unit 12 by the reader 220, the most top first display unit 12 enters an editable mode in the user interface 222. At this time, the user may use the user interface 222 to add, delete and/or amend the sizes and/or contents of the display areas 122a, 122b, 122c. At the same time, the user may also use the user interface 222 to add a product, delete the products 26a, 26b, 26c and/or adjust the sequence of the products 26a, 26b, 26c.

In this embodiment, the storage unit 16 may further store a plurality of price templates, as shown in FIG. 6. The user may set the price template of each of the products 26a, 26b, 26c, 26d in the user interface 222 of the electronic device 22. At this time, the processing unit 18 will control each of the display areas 122a, 122b, 122c, 122d to display one of the price templates, as shown in FIG. 5. It should be noted that the format and number of price templates may be determined according to practical applications, so the invention is not limited to the embodiment shown in the figure. Furthermore, the user may use the price update function provided by the user interface 222 to change the price template and the price information of each of the products 26a, 26b, 26c, 26d.

In this embodiment, the second display unit 20 may be larger than the first display unit 12 and disposed on the top of the shelf 10. Accordingly, as shown in FIG. 5, a shopping mall may use the second display unit 20 to display an advertisement information or other display information to interest a consumer.

In this embodiment, the first sensing unit 14 is configured to sense a characteristic parameter and the storage unit 16 stores a plurality of display information. After the first sensing unit 14 senses the characteristic parameter, the processing unit 18 receives the characteristic parameter from the first sensing unit 14 and controls the first display unit 12 to switch one of the display information being displayed currently to another one of the display information according to the characteristic parameter.

In an embodiment, the characteristic parameter may be a current distance between a human body and the shelf 10. At this time, the first sensing unit 14 may be a camera or a distance sensor. When the first sensing unit 14 is a camera, the processing unit 18 may recognize the current distance between the human body and the shelf 10 from an image captured by the camera by an image recognition technology. In this embodiment, the display information may comprise a price information and an advertisement information. When the processing unit 18 determines that the current distance is smaller than or equal to a threshold, the processing unit 18 may control the first display unit 12 to display one of the price information and the advertisement information. When the processing unit 18 determines that the current distance is larger than the threshold, the processing unit 18 may control the first display unit 12 to display the other one of the price information and the advertisement information. For example, when the processing unit 18 determines that the current distance is smaller than or equal to the threshold, it means that the consumer is close to the shelf 10. At this time, the processing unit 18 may control the first display unit 12 to display the price information of the product for the consumer to refer to and select. When the processing unit 18 determines that the current distance is larger than the threshold, it means that the consumer is far away from the shelf 10. At this time, the processing unit 18 may control the first display unit 12 to display the advertisement information of the product to interest the consumer. The aforesaid threshold may be determined according to practical applications.

In another embodiment, the characteristic parameter may be a number of human bodies in front of the shelf 10. At this time, the first sensing unit 14 may be a camera. The processing unit 18 may recognize the number of human bodies in front of the shelf 10 from an image captured by the camera by an image recognition technology. In this embodiment, the display information may comprise a first advertisement information and a second advertisement information, wherein the first advertisement information may be an advertisement suitable for few persons (e.g. camping equipment advertisement, group game advertisement, and so on) and the second advertisement information may be an advertisement suitable for lots of persons (e.g. movie advertisement, food advertisement, and so on). Accordingly, when the processing unit 18 determines that the number of human bodies is smaller than or equal to a threshold, the processing unit 18 may control the first display unit 12 to display the first advertisement information. On the other hand, when the processing unit 18 determines that the number of human bodies is larger than the threshold, the processing unit 18 may control the first display unit 12 to display the second advertisement information. The aforesaid threshold may be determined according to practical applications.

In another embodiment, the display information may comprise a member information (e.g. member price information) and a non-member information (e.g. non-member price information). When the processing unit 18 determines that the characteristic parameter conforms to a predetermined characteristic parameter, the processing unit 18 may control the first display unit 12 to display the member information. When the processing unit 18 determines that the characteristic parameter does not conform to a predetermined characteristic parameter, the processing unit 18 may control the first display unit 12 to display the non-member information. For further illustration, the processing unit 18 may determine whether a consumer is a member according to the characteristic parameter sensed by the first sensing unit 14. When the consumer is determined as a member, the invention may provide the member information for the consumer to refer to, so as to increase the purchase intention of the consumer.

In this embodiment, the characteristic parameter may be a human face, a fingerprint, an iris or a voice, and the predetermined characteristic parameter may be a predetermined human face, a predetermined fingerprint, a predetermined iris or a predetermined voice corresponding to the characteristic parameter. When the characteristic parameter is a human face, the first sensing unit 14 may be a camera. The processing unit 18 may recognize the human face from an image captured by the camera by an image recognition technology. When the characteristic parameter is a fingerprint, the first sensing unit 14 may be a fingerprint sensor. When the characteristic parameter is an iris, the first sensing unit 14 may be an iris sensor. When the characteristic parameter is a voice, the first sensing unit 14 may be a microphone. Needless to say, the characteristic parameter may also be other characteristics of human body and the first sensing unit 14 may also be other sensors for sensing the characteristics of human body.

In another embodiment, the characteristic parameter may be a gesture. At this time, the first sensing unit 14 may be a touch sensor (e.g. touch panel). A consumer may perform a gesture (e.g. slide gesture) on the first sensing unit 14. When the processing unit 18 determines that the gesture conforms to a predetermined gesture, the processing unit 18 may control the first display unit 12 to switch one of the display information being displayed currently to another one of the display information. For example, when the consumer performs a rightward slide gesture, the processing unit 18 may control the first display unit 12 to switch the price information being displayed currently to the advertisement information. When the consumer performs the rightward slide gesture again, the processing unit 18 may control the first display unit 12 to switch the advertisement information being displayed currently to the price information.

In another embodiment, the processing unit 18 may also control the second display unit 20 to switch one of the display information being displayed currently to another one of the display information according to the aforesaid characteristic parameter. It should be noted that the principle of controlling the second display unit 20 is essentially identical to the principle of controlling the first display unit 12, so the repeated explanation will not be depicted herein again.

In another embodiment, the processing unit 18 may also control the first display unit 12 to display one of the display information (e.g. price information) and control the second display unit 20 to display another one of the display information (e.g. advertisement information) according to the aforesaid characteristic parameter.

In another embodiment, each of the first display units 12 may comprise an input interface (e.g. touch panel). The input interface may be configured to receive an input operation (e.g. double click a specific region of any display area, perform a slide gesture in any display area, etc.) of a user to perform a predetermined function (e.g. enlarge or display a specific information) for the display information of at least one of the display areas.

In another embodiment, when the processing unit 18 determines that the characteristic parameter of a specific user conforms to a predetermined characteristic parameter, the processing unit 18 may control the first display unit 12 to enter an editable mode, so as to use the input interface (e.g. touch panel) to edit the display areas and/or the products corresponding to the display areas. For further illustration, when the processing unit 18 determines that the characteristic parameter of the specific user conforms to the predetermined characteristic parameter, it means that the user may be an administrator of the electronic shelf system 1. At this time, the user may use the input interface of the first display unit 12 to add, delete and/or amend the sizes and/or contents of the display areas 122a, 122b, 122c. At the same time, the user may also use the input interface of the first display unit 12 to add a product, delete the products 26a, 26b, 26c and/or adjust the sequence of the products 26a, 26b, 26c.

Figure 7:
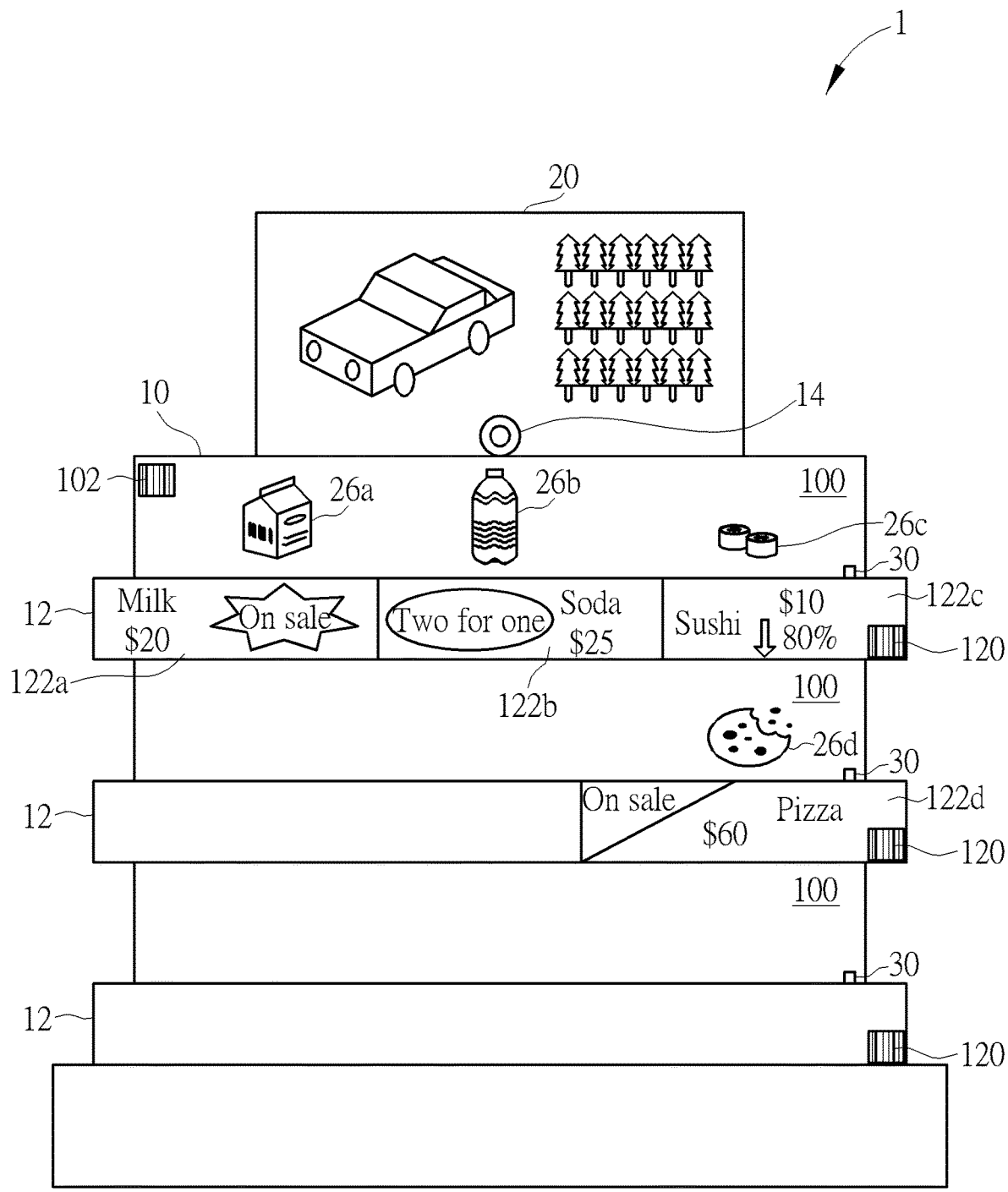
FIG. 7 is a schematic view illustrating an electronic shelf system according to another embodiment of the invention.

Referring to FIG. 7, FIG. 7 is a schematic view illustrating an electronic shelf system 1 according to another embodiment of the invention. As shown in FIG. 7, the electronic shelf system 1 may further comprise a third sensing unit 30 disposed on the compartment 100 and communicating with the processing unit 18. In this embodiment, each of the compartments 100 may be equipped with one third sensing unit 30. When the processing unit 18 determines that the characteristic parameter of a specific user conforms to a predetermined characteristic parameter and any of the third sensing units 30 is triggered, the processing unit 18 may control the corresponding first display unit 12 to enter an editable mode, so as to use the input interface of the first display unit 12 to edit the display areas and/or the products corresponding to the display areas. For further illustration, when the processing unit 18 determines that the characteristic parameter of the specific user conforms to the predetermined characteristic parameter, it means that the user may be an administrator of the electronic shelf system 1. At this time, the user may further trigger any of the third sensing units 30 to use the input interface of the corresponding first display unit 12 to add, delete and/or amend the sizes and/or contents of the display areas 122a, 122b, 122c. At the same time, the user may also use the input interface of the corresponding first display unit 12 to add a product, delete the products 26a, 26b, 26c and/or adjust the sequence of the products 26a, 26b, 26c. In this embodiment, the third sensing unit 30 may be a touch sensor, a weight sensor or other sensors.

Figure 8:
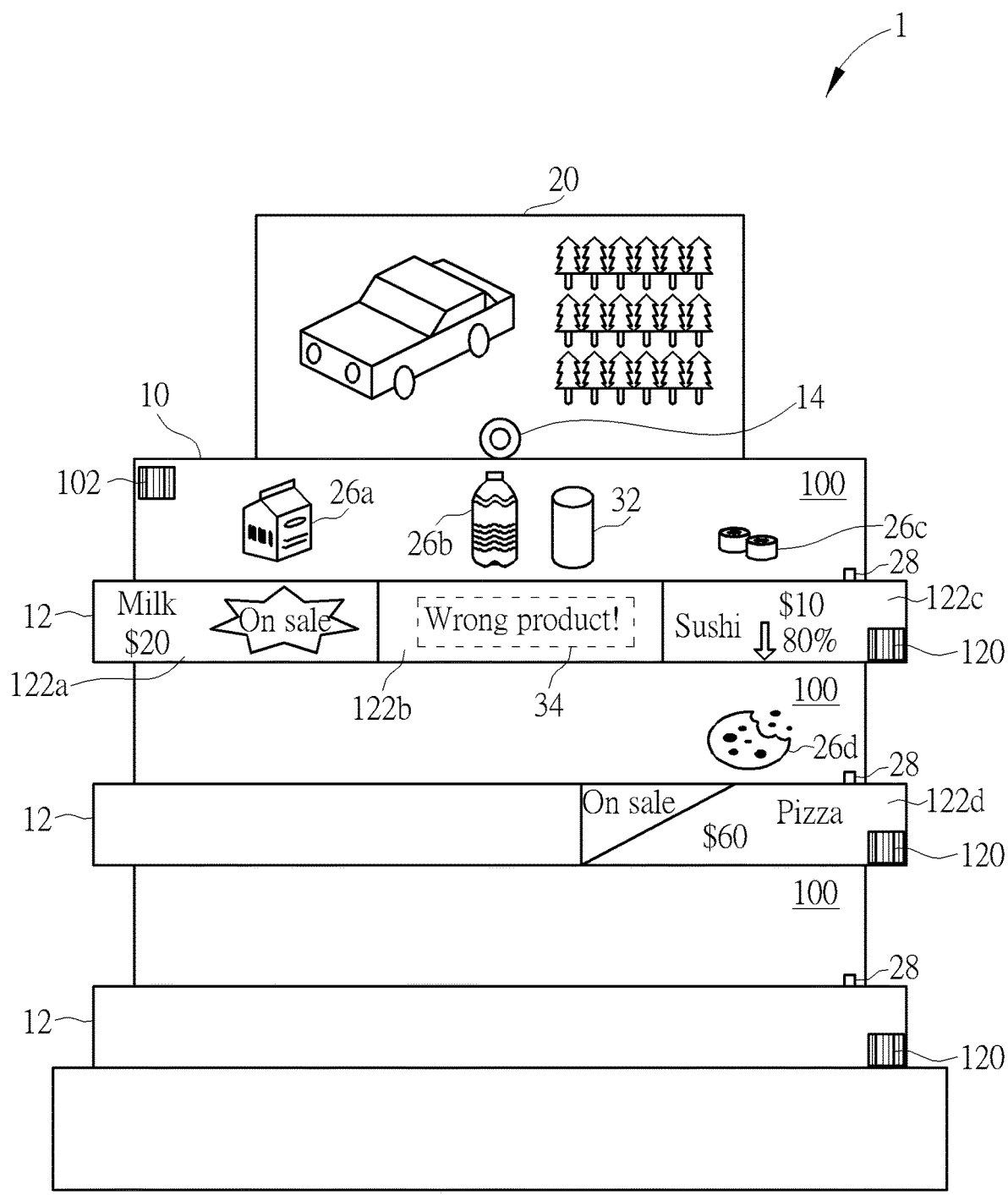
FIG. 8 is a schematic view illustrating an electronic shelf system according to another embodiment of the invention.

Referring to FIG. 8, FIG. 8 is a schematic view illustrating an electronic shelf system 1 according to another embodiment of the invention. As shown in FIG. 8, the electronic shelf system 1 may further comprise at least one second sensing unit 28 disposed on the compartment 100 and communicating with the processing unit 18. Furthermore, as mentioned in the above, the storage unit 16 may store a plurality of product information corresponding to the products 26a, 26b, 26c, 26d. As shown in FIG. 8, when an object 32 is placed on the most top compartment 100, the corresponding second sensing unit 28 will sense the object 32 and transmit at least one sensing signal to the processing unit 18. Then, the processing unit 18 determines whether the object 32 belongs to the products 26a, 26b, 26c placed on the most top compartment 100 according to the at least one sensing signal and the product information. When the processing unit 18 determines that the object 32 does not belong to the products 26a, 26b, 26c placed on the most top compartment 100, the processing unit 18 may control the corresponding first display unit 12 to display a notice message 34, as shown in FIG. 8. In this embodiment, the second sensing unit 28 may be a camera, a light sensor, a weight sensor, a touch sensor or other sensors.

In an embodiment, the second sensing unit 28 may be a weight sensor. At this time, the weight sensor may sense a weight of the object 32. Then, the processing unit 18 may determine whether the weight of the object 32 conforms to the weight of any of the products 26a, 26b, 26c, so as to determine whether the object 32 belongs to the products 26a, 26b, 26c placed on the most top compartment 100.

In another embodiment, the second sensing unit 28 may be a combination of a weight sensor and a camera. At this time, the weight sensor may sense a weight of the object 32 and the camera may capture an image including the object 32. The processing unit 18 may recognize the object 32 from the image captured by the camera by an image recognition technology. When the weight of the object 32 conforms to the weight of any of the products 26a, 26b, 26c, the processing unit 18 may further determine whether the object 32 belongs to the products 26a, 26b, 26c placed on the most top compartment 100 by the image of the object 32 captured by the camera. Furthermore, when the image of the object 32 conforms to the image of any of the products 26a, 26b, 26c, the processing unit 18 may further determine whether the object 32 belongs to the products 26a, 26b, 26c placed on the most top compartment 100 by the weight of the object 32 sensed by the weight sensor. Accordingly, the invention may improve the accuracy of determination effectively by the combination of multiple sensors.

Figure 9:
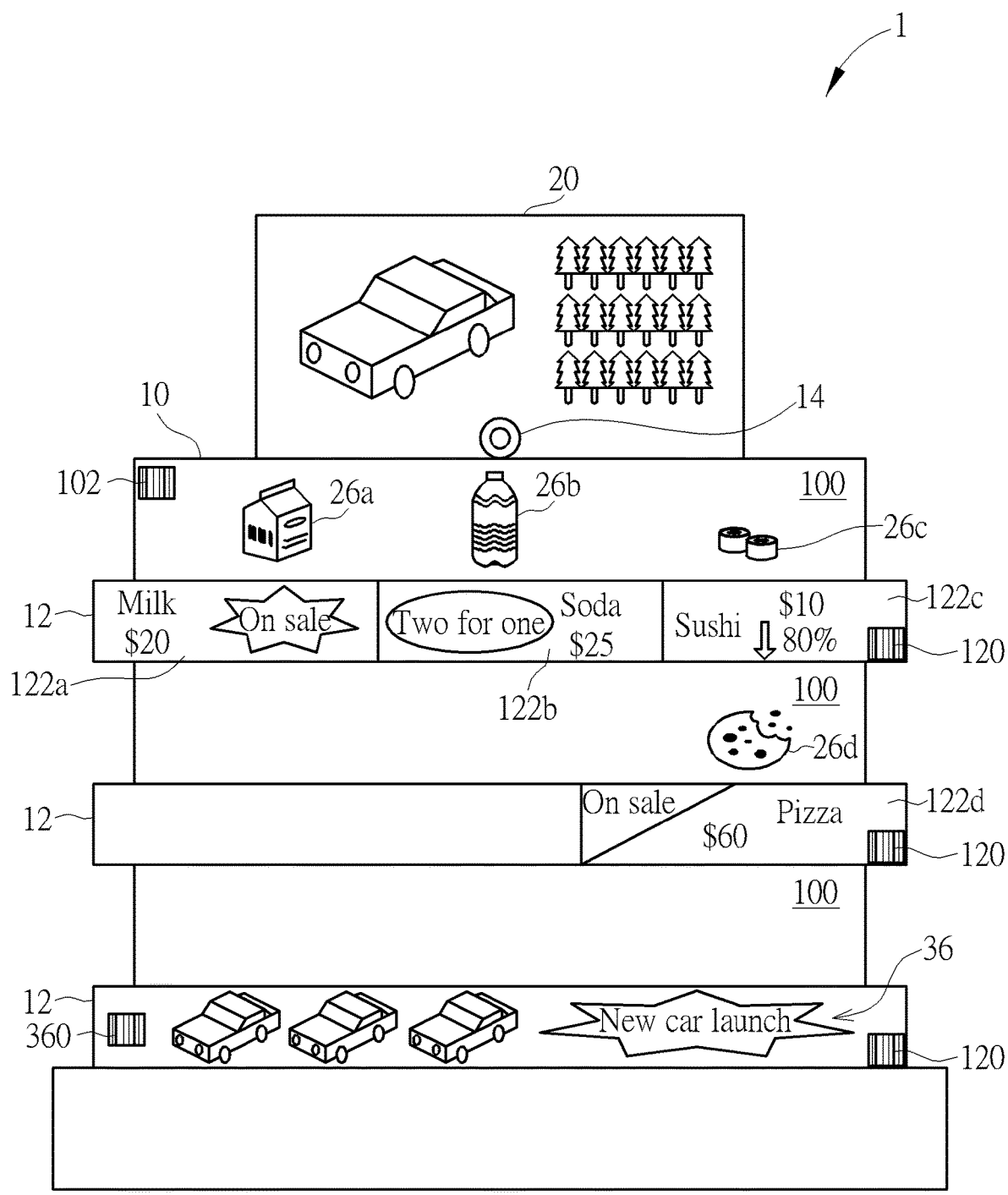
FIG. 9 is a schematic view illustrating an electronic shelf system according to another embodiment of the invention.

Referring to FIG. 9, FIG. 9 is a schematic view illustrating an electronic shelf system 1 according to another embodiment of the invention. In another embodiment, the aforesaid electronic device 22 may read the display unit tag 120 of any of the first display units 12 by the reader 220, so as to display related information of the first display unit 12 in the user interface 222. Then, the user may select any of the first display units 12 in the user interface 222. When the first display unit 12 is selected, the first display unit 12 displays an information tag corresponding to an advertisement information. As shown in FIG. 9, when the most bottom first display unit 12 is selected, the most bottom first display unit 12 displays an information tag 360 corresponding to an advertisement information 36. At this time, the user may operate the electronic device 22 to read the information tag 360 by the reader 220, so as to use the user interface 222 to change the advertisement information 36. In this embodiment, the storage unit 16 may store a plurality of advertisement information for the user to change. Furthermore, the user may use the multimedia update function provided by the user interface 222 to change the advertisement information. It should be noted that the processing unit 18 may deliver an identical advertisement information to each of the first display units 12 synchronously or deliver different advertisement information to each of the first display units 12 according to practical applications. In this embodiment, the information tag 360 may be a barcode tag or other tags corresponding to the reader 220.

As mentioned in the above, the invention utilizes the sensing unit to sense the characteristic parameter related to a consumer and controls the display unit to switch the display information according to the sensed characteristic parameter, so as to interest the consumer. Accordingly, the invention is capable of switching the display information for different consumers in real time, so as to increase the purchase intention of the consumer effectively and then increase sales revenue. Furthermore, the invention may further provide an optimal arrangement manner of the products for the user to refer to, so as to improve efficiency of arranging the products. Moreover, when there is an object or product placed at a wrong position, the invention may further notice the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic shelf system comprising:
a shelf comprising a compartment;
a first display unit disposed on the compartment;
a first sensing unit disposed on the shelf, the first sensing unit being configured to sense a characteristic parameter, the characteristic parameter being a number of human bodies in front of the shelf;
a storage unit storing a plurality of display information, the display information comprising a first advertisement information and a second advertisement information; and
a processing unit communicating with the first display unit, the first sensing unit and the storage unit, the processing unit receiving the characteristic parameter from the first sensing unit and controlling the first display unit to switch one of the display information being displayed currently to another one of the display information according to the characteristic parameter;
wherein when the processing unit determines that the number of human bodies is smaller than or equal to a threshold, the processing unit controls the first display unit to display the first advertisement information, and when the processing unit determines that the number of human bodies is larger than the threshold, the processing unit controls the first display unit to display the second advertisement information.

2. The electronic shelf system of claim 1, further comprising a second display unit disposed on the shelf, the processing unit controlling the second display unit to switch one of the display information being displayed currently to another one of the display information according to the characteristic parameter.

3. The electronic shelf system of claim 1, further comprising a second display unit disposed on the shelf, the processing unit controlling the first display unit to display one of the display information and controlling the second display unit to display another one of the display information according to the characteristic parameter.

4. The electronic shelf system of claim 1, further comprising an electronic device communicating with the processing unit, the electronic device comprising a reader, the shelf comprising a shelf tag and a plurality of compartments, the electronic shelf system comprising a plurality of first display units, each of the first display units being disposed on one of the compartments, the storage unit further storing an arrangement rule, a shelf information corresponding to the shelf and a plurality of product information corresponding to a plurality of products, each of the products comprising a product tag, the electronic device reading the shelf tag and the product tag by the reader, such that the processing unit generates an arrangement manner for arranging the products on the compartments according to the shelf information, the product information and the arrangement rule and controls the first display units to display content of the products according to the arrangement manner.

5. The electronic shelf system of claim 4, wherein the arrangement manner comprises an arrangement position of each of the products on at least one of the compartments and a size of a display area of the first display unit.

6. The electronic shelf system of claim 4, wherein the shelf information comprises a size, an allowable weight or a combination thereof of each of the compartments, the product information comprises a size, a weight or a combination thereof of the product, and the arrangement rule comprises a sales revenue, a profit, a historical sales volume or a combination thereof of each of the products.

7. The electronic shelf system of claim 1, further comprising at least one second sensing unit disposed on the compartment and communicating with the processing unit, the storage unit further storing a plurality of product information corresponding to a plurality of products; when an object is placed on the compartment, the at least one second sensing unit sensing the object and transmitting at least one sensing signal to the processing unit; the processing unit determining whether the object belongs to the product placed on the compartment according to the at least one sensing signal and the product information; when the processing unit determines that the object does not belong to the product placed on the compartment, the processing unit controlling the first display unit to display a notice message.

8. The electronic shelf system of claim 1, wherein the first display unit is divided into a plurality of display areas, the electronic shelf system further comprises an electronic device, the electronic device comprises a reader and a user interface, the first display unit comprises a display unit tag, the electronic device reads the display unit tag by the reader, such that the first display unit enters an editable mode in the user interface, so as to use the user interface to edit the display areas and/or the products corresponding to the display areas.

9. The electronic shelf system of claim 1, wherein the first display unit is divided into a plurality of display areas, the first display unit comprises an input interface, the input interface receives an input operation to perform a predetermined function for the display information of at least one of the display areas.

10. The electronic shelf system of claim 1, wherein the first display unit is divided into a plurality of display areas, the storage unit further stores a plurality of price templates, the processing unit controls each of the display areas to display one of the price templates.

11. The electronic shelf system of claim 1, further comprising an electronic device, the electronic device comprising a reader and a user interface, the first display unit comprising a display unit tag, the electronic device reading the display unit tag by the reader to display the first display unit in the user interface; when the first display unit is selected, the first display unit displaying an information tag corresponding to an advertisement information; the electronic device reading the information tag by the reader to use the user interface to change the advertisement information.

12. An electronic shelf system comprising:
a shelf comprising a compartment;
a first display unit disposed on the compartment;
a first sensing unit disposed on the shelf, the first sensing unit being configured to sense a characteristic parameter;
a storage unit storing a plurality of display information, the display information comprising a member information and a non-member information; and
a processing unit communicating with the first display unit, the first sensing unit and the storage unit, the processing unit receiving the characteristic parameter from the first sensing unit and controlling the first display unit to switch one of the display information being displayed currently to another one of the display information according to the characteristic parameter;
wherein when the processing unit determines that the characteristic parameter conforms to a predetermined characteristic parameter, the processing unit controls the first display unit to display the member information, and when the processing unit determines that the characteristic parameter does not conform to a predetermined characteristic parameter, the processing unit controls the first display unit to display the non-member information.

13. The electronic shelf system of claim 12, wherein the characteristic parameter is a human face, a fingerprint, an iris or a voice, and the predetermined characteristic parameter is a predetermined human face, a predetermined fingerprint, a predetermined iris or a predetermined voice corresponding to the characteristic parameter.

14. The electronic shelf system of claim 12, further comprising a second display unit disposed on the shelf, the processing unit controlling the second display unit to switch one of the display information being displayed currently to another one of the display information according to the characteristic parameter.

15. The electronic shelf system of claim 12, further comprising a second display unit disposed on the shelf, the processing unit controlling the first display unit to display one of the display information and controlling the second display unit to display another one of the display information according to the characteristic parameter.

16. The electronic shelf system of claim 12, further comprising an electronic device communicating with the processing unit, the electronic device comprising a reader, the shelf comprising a shelf tag and a plurality of compartments, the electronic shelf system comprising a plurality of first display units, each of the first display units being disposed on one of the compartments, the storage unit further storing an arrangement rule, a shelf information corresponding to the shelf and a plurality of product information corresponding to a plurality of products, each of the products comprising a product tag, the electronic device reading the shelf tag and the product tag by the reader, such that the processing unit generates an arrangement manner for arranging the products on the compartments according to the shelf information, the product information and the arrangement rule and controls the first display units to display content of the products according to the arrangement manner.

17. The electronic shelf system of claim 16, wherein the arrangement manner comprises an arrangement position of each of the products on at least one of the compartments and a size of a display area of the first display unit.

18. The electronic shelf system of claim 16, wherein the shelf information comprises a size, an allowable weight or a combination thereof of each of the compartments, the product information comprises a size, a weight or a combination thereof of the product, and the arrangement rule comprises a sales revenue, a profit, a historical sales volume or a combination thereof of each of the products.

19. The electronic shelf system of claim 12, further comprising at least one second sensing unit disposed on the compartment and communicating with the processing unit, the storage unit further storing a plurality of product information corresponding to a plurality of products; when an object is placed on the compartment, the at least one second sensing unit sensing the object and transmitting at least one sensing signal to the processing unit; the processing unit determining whether the object belongs to the product placed on the compartment according to the at least one sensing signal and the product information; when the processing unit determines that the object does not belong to the product placed on the compartment, the processing unit controlling the first display unit to display a notice message.

20. The electronic shelf system of claim 12, wherein the first display unit is divided into a plurality of display areas, the electronic shelf system further comprises an electronic device, the electronic device comprises a reader and a user interface, the first display unit comprises a display unit tag, the electronic device reads the display unit tag by the reader, such that the first display unit enters an editable mode in the user interface, so as to use the user interface to edit the display areas and/or the products corresponding to the display areas.

21. The electronic shelf system of claim 12, wherein the first display unit is divided into a plurality of display areas, the first display unit comprises an input interface, the input interface receives an input operation to perform a predetermined function for the display information of at least one of the display areas.

22. The electronic shelf system of claim 12, wherein the first display unit is divided into a plurality of display areas, the storage unit further stores a plurality of price templates, the processing unit controls each of the display areas to display one of the price templates.

23. The electronic shelf system of claim 12, further comprising an electronic device, the electronic device comprising a reader and a user interface, the first display unit comprising a display unit tag, the electronic device reading the display unit tag by the reader to display the first display unit in the user interface; when the first display unit is selected, the first display unit displaying an information tag corresponding to an advertisement information; the electronic device reading the information tag by the reader to use the user interface to change the advertisement information.

\* \* \* \* \*